United States Patent
Anglin et al.

(10) Patent No.: US 9,563,516 B2
(45) Date of Patent: *Feb. 7, 2017

(54) MANAGING BACKUP OPERATIONS FROM A CLIENT SYSTEM TO A PRIMARY SERVER AND SECONDARY SERVER

(71) Applicant: International Business Machines Corporation, Armonk, NY (US)

(72) Inventors: Matthew J. Anglin, Tucson, AZ (US); David M. Cannon, Tucson, AZ (US); Ken Eugene Hannigan, Tucson, AZ (US); Kevin Patrick Hoyt, San Jose, CA (US); Erick Christian Kissel, Tucson, AZ (US); Howard N. Martin, Vail, AZ (US); Michael Harry Segapeli, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 14/495,591

(22) Filed: Sep. 24, 2014

(65) Prior Publication Data

US 2016/0034357 A1 Feb. 4, 2016

Related U.S. Application Data

(63) Continuation of application No. 14/448,953, filed on Jul. 31, 2014.

(51) Int. Cl.
*G06F 11/14* (2006.01)
*H04L 29/08* (2006.01)
*H04L 29/14* (2006.01)
*G06F 11/20* (2006.01)

(52) U.S. Cl.
CPC ....... *G06F 11/1461* (2013.01); *G06F 11/1458* (2013.01); *G06F 11/1464* (2013.01);
(Continued)

(58) Field of Classification Search
CPC .............. G06F 11/1448; G06F 11/1458; G06F 11/1461
See application file for complete search history.

(56) References Cited

U.S. PATENT DOCUMENTS 6,161,125 A 12/2000 Traversat et al.
7,451,209 B1* 11/2008 Schieber ............. H04L 41/5012
709/223

(Continued)

FOREIGN PATENT DOCUMENTS

WO 2010/030793 3/2010

OTHER PUBLICATIONS

Valente et al., "Replicated Grid Resources", dated 2011, University of Virginia Charlottesville, VA, USA, Total 9 pages.
(Continued)

*Primary Examiner* — Joseph Schell
(74) *Attorney, Agent, or Firm* — David W. Victor; Konrad, Raynes, Davda and Victor LLP

(57) ABSTRACT

Provided are techniques for managing backup operations from a client system to a primary server and secondary server. A determination is made at the client system of whether a state of the data on the secondary server permits a backup operation in response to determining that the primary server is unavailable when a force failover parameter is not set. The client system reattempts to connect to the primary server to perform the backup operation at the primary server in response to determining that the state of the data on the secondary server does not permit the backup operation. The client system performs the backup operation at the secondary server in response to determining that the state of the secondary server permits the backup operation.

9 Claims, 6 Drawing Sheets

(52) U.S. Cl.
CPC ...... *G06F 11/2028* (2013.01); *H04L 67/1095* (2013.01); *H04L 69/40* (2013.01); *G06F 11/1446* (2013.01); *G06F 11/1448* (2013.01); *G06F 11/1456* (2013.01)

(56) References Cited

U.S. PATENT DOCUMENTS

| | | | |
|---|---|---|---|
| 9,251,008 B2* | 2/2016 | Anglin | G06F 11/1448 |
| 2002/0194268 A1 | 12/2002 | Lai | |
| 2006/0015770 A1* | 1/2006 | Dicorpo | G06F 11/2053 714/5.1 |
| 2006/0179147 A1* | 8/2006 | Tran | G06F 11/2012 709/227 |
| 2006/0294207 A1 | 12/2006 | Barsness et al. | |
| 2007/0168704 A1 | 7/2007 | Connolly et al. | |
| 2008/0155023 A1* | 6/2008 | Kadashevich | G06F 11/1482 709/206 |
| 2009/0070623 A1 | 3/2009 | Sciacca | |
| 2011/0238626 A1 | 9/2011 | Hao et al. | |
| 2012/0084369 A1* | 4/2012 | Henriquez | H04L 67/08 709/206 |
| 2012/0124431 A1* | 5/2012 | Bauer | H04L 41/0663 714/55 |
| 2015/0149416 A1* | 5/2015 | Dhavale | G06F 17/30348 707/687 |

OTHER PUBLICATIONS

"Method of Failover to a Different Schema Type by LDAP Client in Heterogenous Directory Environment" dated Sep. 27, 2011, An IP.com Prior Art Database Technical Disclosure, Total 3 pages.

"A Client Assisted Mass Fallback Solution in a Multi-Tiered Model", dated May 23, 2012, An IP.com Prior Art Database Technical Disclosure, Total 6 pages.

"High Availability Server Startup Method", dated Mar. 12, 2013, An IP.com Prior Art Database Technical Disclosure, Total 6 pages.

US Patenet Application, dated Jul. 31, 2014, for U.S. Appl. No. 14/448,953, filed Jul. 31, 2014, invented by Mathew J. Anglin et al., Total 32 pages.

Preliminary Amendment, dated Sep. 24, 2014, for U.S. Appl. No. 14/448,953, filed Jul. 31, 2014, invented by Mathew J. Anglin et al., 10 Total pages.

List of Patents or Patent Applications Treated as Related, dated Oct. 8, 2014, Total 2 pages.

Office Action, dated Feb. 26, 2016, for U.S. Appl. No. 14/448,953, filed Jul. 31, 2014, invented by Matthew J. Anglin et al., Total 25 pages.

Response to Office Action, dated May 26, 2016, for U.S. Appl. No. 14/448,953, filed Jul. 31, 2014, invented by Matthew J. Anglin et al., Total 10 pages.

Notice of Allowance, dated Jul. 20, 2016, for U.S. Appl. No. 14/448,953, filed Jul. 31, 2014, invented by Matthew J. Anglin et al., Total 5 pages.

US Patent Application, dated Sep. 15, 2016, for U.S. Appl. No. 15/266,999, filed Sep. 15, 2016, invented by Matthew J. Anglin et al., Total 32 pages.

Preliminary Amendment, dated Sep. 15, 2016, for U.S. Appl. No. 15/266,999, filed Sep. 15, 2016, invented by Matthew J. Anglin et al., Total 9 pages.

List of Patents or Patent Applications Treated as Related, dated Sep. 16, 2016, Total 2 pages.

* cited by examiner

Object Information

Backup Policy Parameters

Backup Settings

MANAGING BACKUP OPERATIONS FROM A CLIENT SYSTEM TO A PRIMARY SERVER AND SECONDARY SERVER

CROSS-REFERENCE TO RELATED APPLICATION

This application is a continuation of U.S. patent application Ser. No. 14/448,953, filed Jul. 31, 2014, which application is incorporated herein by reference in its entirety.

BACKGROUND OF THE INVENTION

1. Field of the Invention

The present invention relates to a computer program product, system, and method for managing backup operations from a client system to a primary server and secondary server.

2. Description of the Related Art

Backup servers may be configured to replicate client backup data between two servers in support of disaster recovery. Typically, one server is preferred over other servers for performing client backup/restore operations. When the preferred backup server becomes inoperative, the client systems being managed by the "dead" server can be manually reconfigured by an administrator to connect to an alternative backup server that has a replicated copy of the client's data.

Once the preferred server returns to service, an administrator must manually reconfigure the clients to again connect to their preferred backup servers of choice. For performance reasons it may be important to avoid store operations to less than optimal alternative servers and to try to maintain the most up-to-date data on the preferred server.

SUMMARY

Provided are a computer program product, system, and method for managing backup operations from a client system to a primary server and secondary server. A determination is made at the client system of whether a state of the data on the secondary server permits a backup operation in response to determining that the primary server is unavailable when a force failover parameter is not set. The client system reattempts to connect to the primary server to perform the backup operation at the primary server in response to determining that the state of the data on the secondary server does not permit the backup operation. The client system performs the backup operation at the secondary server in response to determining that the state of the secondary server permits the backup operation.

DETAILED DESCRIPTION

There are several challenges when handling the situation when the preferred backup server is unavailable, such as reconfiguring client nodes to perform operations to an alternative server while the preferred server is down, and restoring the original configuration of the client nodes when the preferred server returns to service. Performing this reconfiguration manually is both slow and subject to human error. Further, during minor interruptions or planned outages of a preferred backup server, administrators may want to determine if and when clients should store data to alternate servers during failover, since this may affect the performance of subsequent backup and restore operations.

Moreover, different clients may require different storage policies during a failover on alternate servers. Some clients may tolerate backup data that is distributed across multiple backup servers, while other clients will perform less optimally when their data is distributed.

During the time that the preferred backup server is unavailable, clients may have stored data to an alternate server. For performance reasons this data should be transferred back to the preferred server when available to "reconcile" data on the preferred server with updates made while that server was unavailable. As determined by configurable policy, data may be reconciled at the preferred server by a server-to-server transfer from the alternate server to the preferred server or by having the client retransmit data. Administrators may be able to select which of these methods to use at reconciliation.

Described embodiments provide techniques for automatically managing reconfiguration of failover and failback when client systems perform operations with respect to primary and secondary servers. A client backup program determines whether a state of the data on a secondary alternate server permits a backup operation in response to determining that the primary preferred server is unavailable when a force failover parameter is not set. The client program reattempts to connect to the primary server to perform the backup operation at the primary server in response to determining that the state of the data on the secondary server does not permit the backup operation. The client program performs the backup operation with respect to the secondary server in response to determining that the state of the secondary server permits the backup operation.

Figure 1:
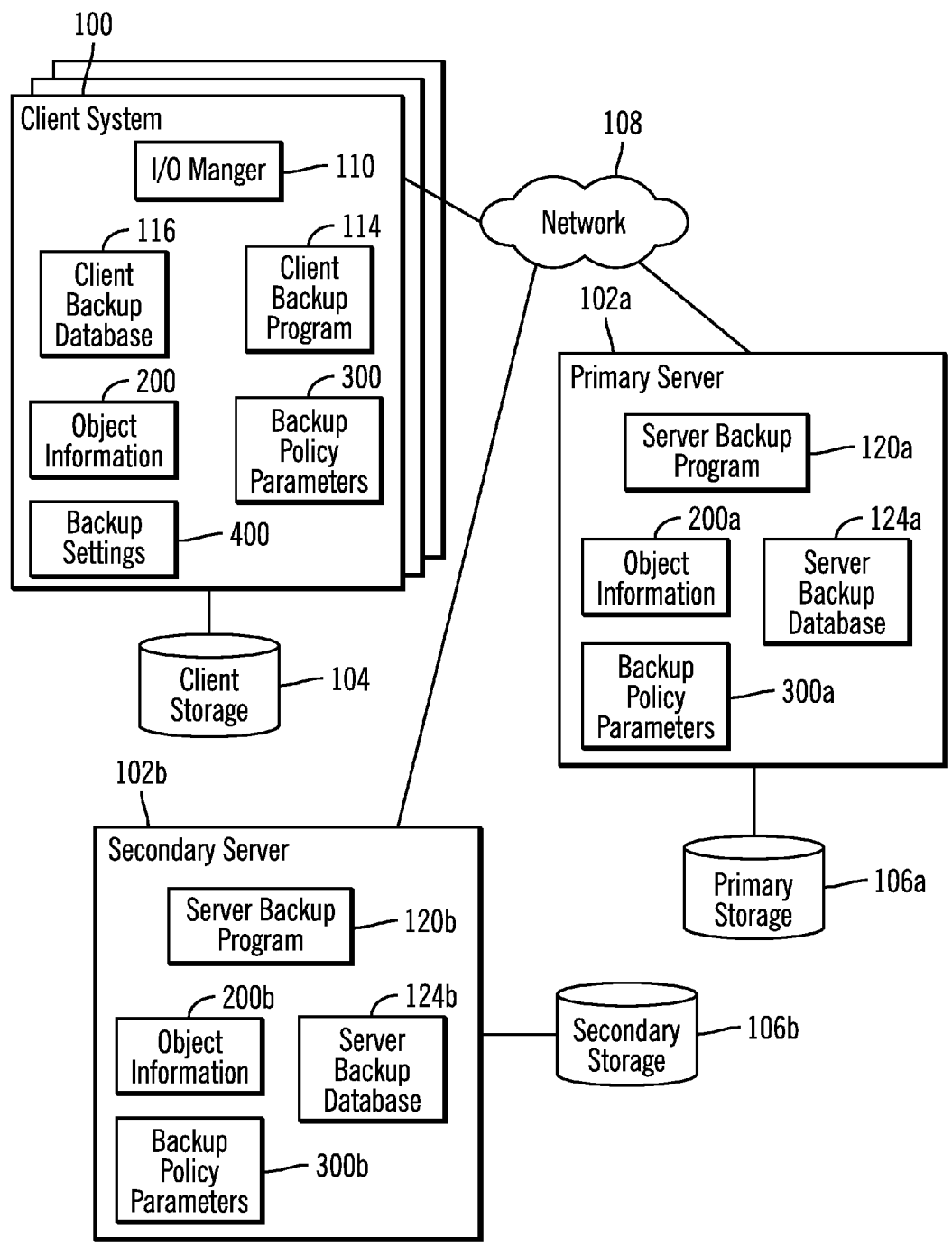
FIG. 1 illustrates an embodiment of a backup storage environment.

FIG. 1 illustrates an embodiment of a backup storage environment having a plurality of client systems 100 connected to a primary server 102a and secondary server 102b. Client systems 100 and primary 102a and secondary 102b servers manage storages 104, 106a, 106b, respectively. The client 100 may prefer to perform backup operations on the primary server 102a and based on failover and failback policies and primary server 102a availability may alternatively select to perform backup operations with respect to the secondary server 102b. Further, the primary 102a and secondary 102b servers may independently replicate data so that both servers 102a, 102b maintain a most current consistent copy of the client data that is copied or backed-up to one of the servers 102a, 102b. The client systems 100 and servers 102a, 102b may communicate over a network 108. The terms "client systems", "primary server", and "secondary server" may reference both the system/server component and the storage managed by that system/server The client system 100 includes an Input/Output ("I/O") manager 110 to manage I/O requests to objects in the client storage 104 from attached systems or application programs in the client system 100. The objects may comprise files, application objects, database objects, images, etc. The client system 100 includes object information 200 on the objects, which may comprise metadata, including a token for each object or a set of backup data and objects. The token may be tied to or defined as a timestamp, and it may include additional information. The client system 100 further includes a client backup program 114 to backup objects in the storage 104 to the primary 102a or secondary 102b server based on failover and failback policies. The client backup program 114 may maintain information on objects backed up in the primary 102a and secondary server 102b in a client backup database 116. The client backup policy parameters 300 provide the client backup program 114 with policy parameters for making decisions with respect to the backup operations.

The servers 102a, 102b each include: a server backup program 120a, 120b to coordinate backup operations with the client backup program 114 and to synchronize data between the servers 102a, 102b; object information 200a, 200b on the objects, which may comprise metadata, and includes the token which may include a timestamp (and in certain embodiments additional information) for the objects when they were stored on the servers 102a, 102b; a server backup database 124a, 124b having information on objects backed up in the primary 102a and secondary server 102b; and server backup policy parameters 300a, 300b which provide the server backup programs 120a, 120b with policy parameters for making decisions with respect to the backup operations. The client backup program 114 maintains client backup settings 400 having information used by the client backup program 114 to perform the backup operations at the servers 102a, 102b.

The backup operations performed by the client backup programs 114 may comprise writing or transferring objects in the client storage 104 to one of the primary 102a or secondary 102b servers, such as writing, backing-up data (e.g., a full, incremental, differential or reverse incremental backup), archiving data or hierarchical storage management of data. The backup operation may also comprise reading or transferring objects from one of the servers 102a, 102b back to the client 100, such as a restore, recall, read, retrieve, etc.

In the embodiment of FIG. 1 there are shown one pair of primary 102a and secondary 102b servers. However, in different implementations there may be additional pairs of primary 102a and secondary 102b servers with which the client systems 100 may connect. In one embodiment, there may be one preferred server and multiple secondary servers to which failover can occur.

The servers 102a, 102b may comprise an enterprise storage controller/server suitable for managing access to attached storage devices. The client systems 100 may comprise different types of computing systems, such as enterprise storage servers, workstations, mainframes, personal computers, tablets, portable computing devices, telephony, where different client systems 100 may comprise the same or different types of computing devices.

The network 108 may comprise a Storage Area Network (SAN), Local Area Network (LAN), Intranet, the Internet, Wide Area Network (WAN), peer-to-peer network, wireless network, arbitrated loop network, etc. The storages 104, 106a, 106b may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices in which the storages 104,106a, 106b are implemented may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

Figure 2:
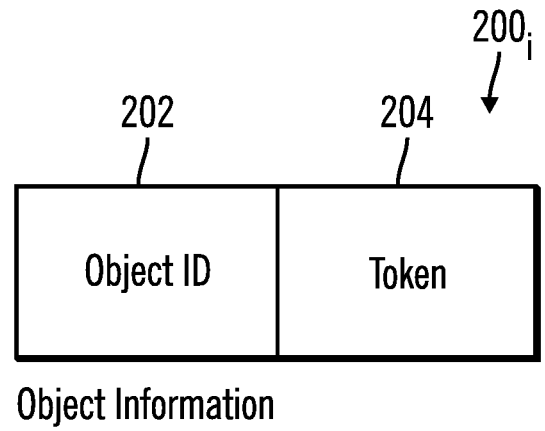
FIG. 2 illustrates an embodiment of object information.

FIG. 2 illustrates an embodiment of an object information instance $200_i$ for one object in the client 104 and server 106a, 106b storages, an object identifier (ID) 202 and a token 204 having a timestamp or other object version information to distinguish from down level objects and upper level or higher version objects. As mentioned, a token may be provided for one object or a set of backup objects. When one of the servers 102a, 102b become unavailable, then the tokens for their objects on the storages 106a, 106b may be compared with the client object tokens 204 to determine the version level of the server object relative to the client objects.

Figure 3:
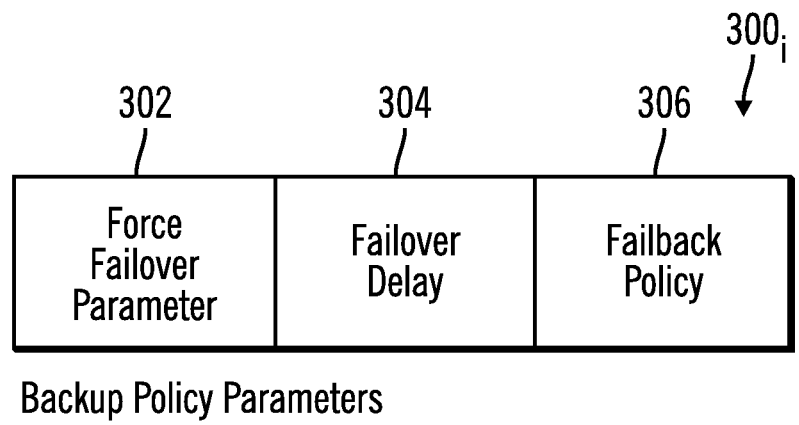
FIG. 3 illustrates an embodiment of backup policy parameters.

FIG. 3 illustrates an embodiment of an instance 300, of the backup policy parameters for the client 300 and the servers 300a, 300b, including a force failover parameter 302, failover delay 304, and a failback policy 306. The force failover parameter 302 may comprise a flag or Boolean value indicating whether the client backup program 114 should proceed automatically to perform the backup or other operation at the secondary server 102b or first attempt to connect to the primary server 102a to perform the operation initiated by the client backup program 114 including, but not limited to a backup specific operation. The failover delay 304 parameter indicates a duration of a failover timer that must expire before the client backup program 114 will proceed to the secondary server 102b for a backup operation. A failback policy 306 parameter indicates whether the client backup program 114 will attempt to reconcile data back to the primary server 102a with the most recent version of the data or whether the secondary server 102b will reconcile the data to the primary server 102a. A setting of "any" for the failback policy 306 may indicate that the data at the primary server 102a should be reconciled either from the client system 100 or the secondary server 102b when the primary server 102a is determined to have data down level from the data at the client 100 or the secondary server 102b.

In certain implementations, the force failover parameter 302 may be maintained on each client 100, and different clients may have different force failover parameter 302 settings, such as to test failover of a client 100 to the correct secondary server 102b or to support a failback policy that requires the servers 102a, 102b to reconcile data, such that clients may be redirected to the secondary server 102b until the two servers have reconciled data on the primary server 102a. The failover delay 304 and failback policy 306 may be maintained at the servers 102a, 102b and propagated to the clients 100 to use, or alternatively configured differently on the client systems 100 so that different clients implement different of the backup policies.

Figure 4:
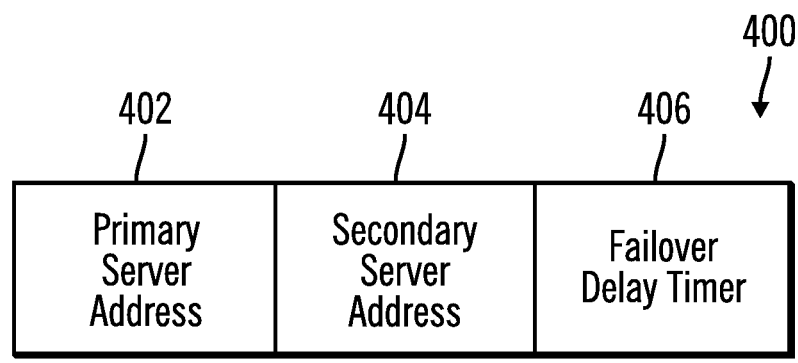
FIG. 4 illustrates an embodiment of backup settings.

FIG. 4 illustrates an embodiment of the client backup settings 400, including a primary server address 402 and secondary server address 404 used to communicate with the servers 102a, 102b over the network 108; and a failover delay timer 406 that may be set to the duration of the failover delay 304.

The failover delay 304 and failover delay timer 406 may be used for both read and/or write operations, such as for recovering data or backing up the data at the secondary server 102b. In further embodiments, there may be separate read and write failover delays and separate read and write failover delay timers so these timers can be managed independently. For example, in certain embodiments, the read failover delay timer may be set to a low value such as two minutes to allow users to access their data on the secondary server with minimal delay while still preventing immediate failover in the event of a transient network or server outage. On the other hand, the write failover delay timer could be set to a relatively larger value such as 120 minutes to require a longer delay before new data is written to the secondary server. In a still further embodiment, the read and/or write delay timers may be set to zero to allow for immediate failover.

The servers 102a, 102b may continually transmit network connection information of the primary 102a and secondary 102b servers to the clients 100, and the client backup programs 114 in the clients 100 maintain the transmitted information in the server addresses 402 and 404 to use to connect to the primary 102a and secondary 102b servers. A server may be designated as the primary 102a or preferred server if it is higher performing, in closer proximity to the clients 100 or preferable due to some other factor.

Figure 5A:
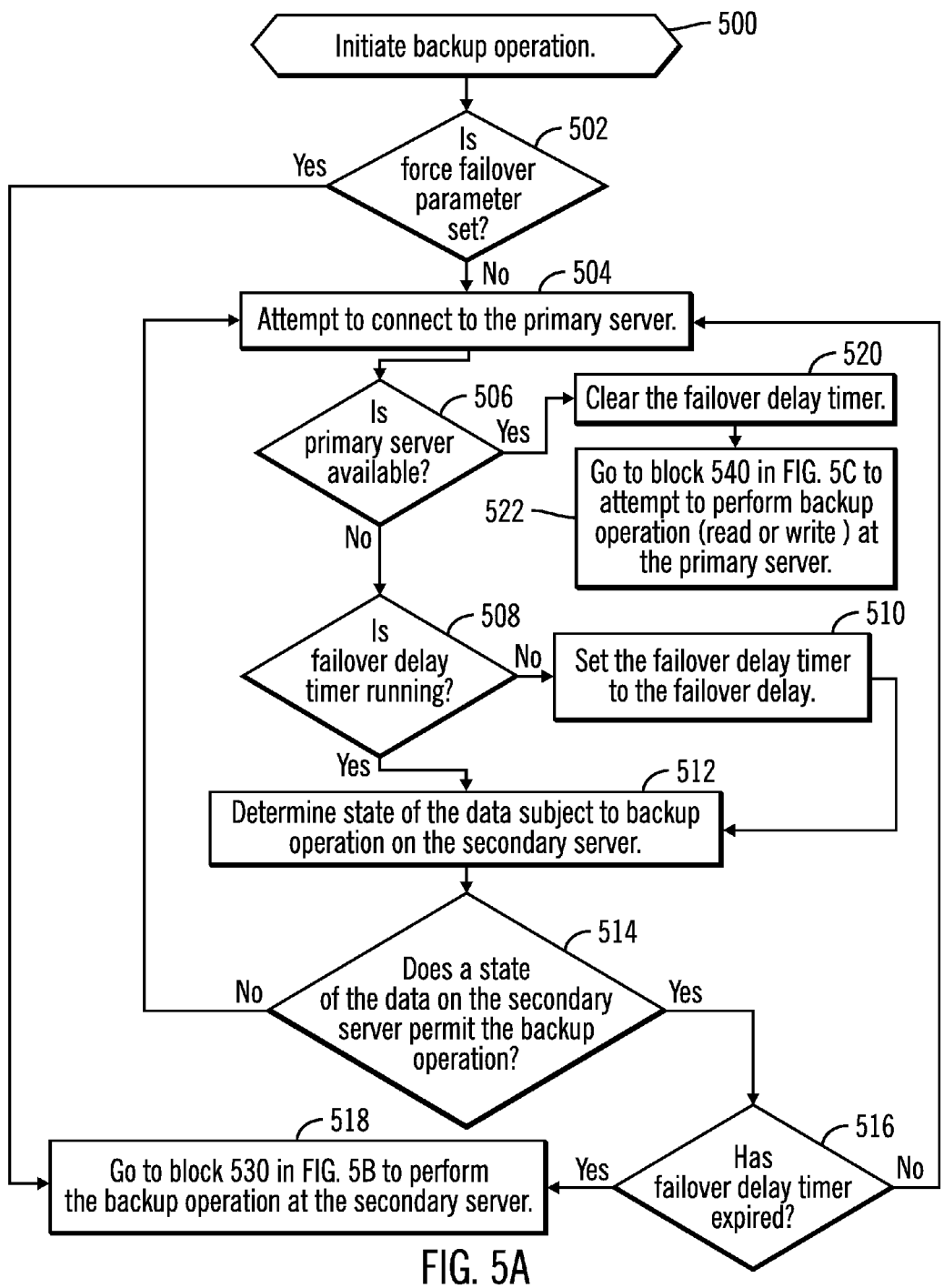
FIGS. 5a, 5b, and 5c illustrate an embodiment of operations performed at the client system to failover and failback to the primary and secondary servers when performing backup operations.
Figure 5B:
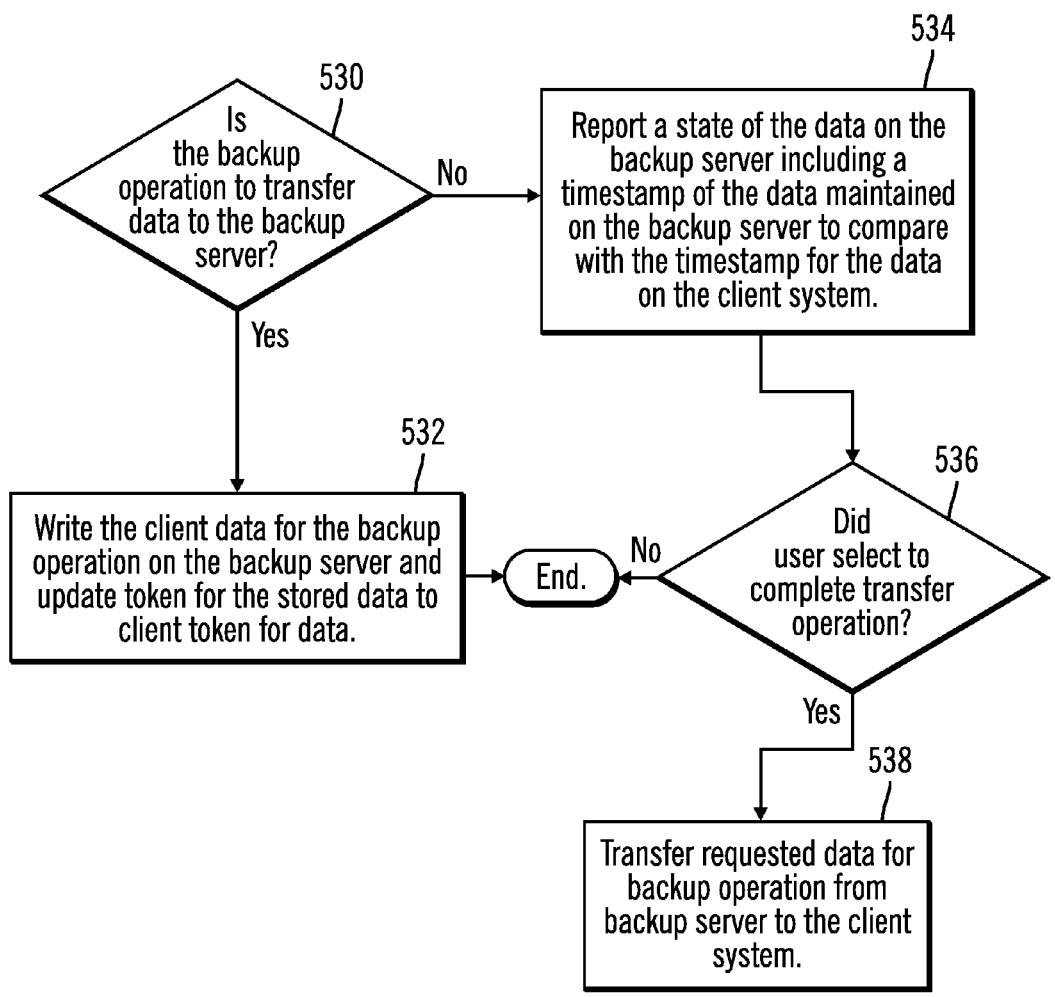
Figure 5C:
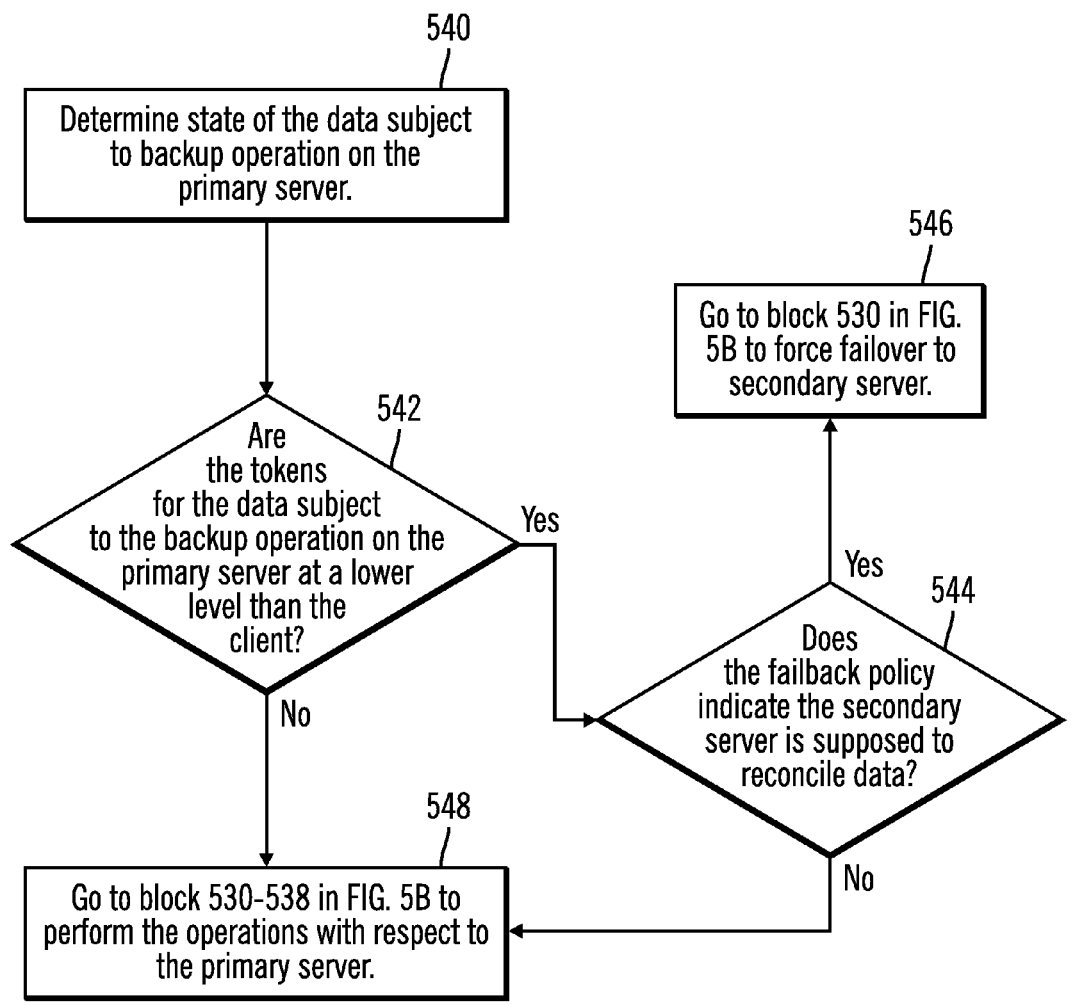

FIGS. 5a, 5b, and 5c illustrate an embodiment of operations performed by the client backup program 114 to initiate a backup operation. Upon initiating (at block 500) the backup operation, if (at block 502) the force failover parameter 302 is not set to indicate automatic failover to the secondary server 102b, then the client backup program 114 attempts (at block 504) to connect to the primary server 102a using the primary server address 402.

If (at block 506) the primary server 102a is not available and if (at block 508) the failover delay timer 406 is not running, or was not started, then the failover delay timer 406 is set (at block 510) to the failover delay 304. When the timer 406 is running, from the yes branch of block 508 or from block 510, the client backup program 114 determines (at block 512) the state of the data subject to the backup operation at the secondary server 102b, stored on the secondary storage 106b. For instance, if the backup operation requires a previous version of the data, such as an incremental, differential, or reverse incremental backup requiring a full backup of the data, then the state that is determined may comprise determining if there is a full backup of the data in the secondary storage 106b. If (at block 514) the state of the data on the secondary server 102b does not permit the backup operation, e.g., there is no full backup for the incremental on the secondary storage 106b, then control returns to block 504 to reattempt to connect to the primary server 102a.

If (at block 514) the state of the data does permit the backup operation on the secondary server 102b and if (at block 516) the failover delay timer 406 timer has not expired, then control proceeds back to block 504 to reattempt to connect to the primary server 102a while the timer has not expired. In this way, the failover delay timer 406 requires the client backup program 114 to wait for a period before failing over in the event the unavailability of the primary server 102a is just temporary and may be back soon. This allows the client backup program 114 to continue to use the preferred primary server 102a without interruption for momentary unavailability. If (at block 516) the failover delay timer 406 has expired, then control proceeds (at block 518) to block 530 in FIG. 5b to perform the backup operation with respect to the secondary server 102b.

With respect to FIG. 5b, if (at block 530) the backup operation is to transfer data to the backup server, such as a write or backup operation, then the client backup program 114 writes (at block 532) the client data for the backup operation to a backup server, which may comprise the primary 102a or secondary server 102b to which the backup operation is directed, which is stored on the primary 106a or secondary storage 106b, and updates the client token 204 and the server 102a, 102b token to the current level. If (at block 530) the backup operation is to retrieve data from the backup server 102a, 102b, then the client backup program 114 reports (at block 534) a state of the data on the backup server 102a, 102b including a token 204, e.g., timestamp, of the data maintained on the backup server to compare with the token 204 for the data at the client system 100. The client backup program 114 may report the token information by generating the information in a user interface to allow the user of the client system 100 to select to complete or end backup operation. This makes the user of the client system 100 aware that the backup server 102a, 102b has a down level (i.e., lower) version of the objects subject to the backup operation and allows selection of whether to proceed. If (at block 536) the user of the client system 100 selects to complete the backup transfer operation, then the requested data for the backup operation is transferred (at block 538) from the backup server 102a, 102b to the client system 100. If (at block 536) the user has not selected to complete the operation or after performing the operation at block 532, control ends.

If (at block 506 in FIG. 5a), the primary server 102a is available, which may be determined after performing multiple iterations of the operations between 504 and 514, then the failover delay timer 406 is cleared (at block 520) and control proceeds (at block 522) to block 540 in FIG. 5c to perform the backup operation (read or write) at the primary server 102a.

With respect to FIG. 5c, at block 540, the client backup program 114 determines the state of the data subject to the backup operation on the primary server 102a storage 106a, which may be the same operation performed as described with respect to 512 on the secondary server 102b. If (at block 542) the tokens 204 for the data subject to the backup operation at the primary server 102a are at a lower level, i.e., earlier version, than the objects on the client system 100, which has the most current version of the data, then a determination is made (at block 544) from the failback policy parameter 306 whether the secondary server 102b is supposed to reconcile the data on the primary server 102a. If so, then control proceeds (at block 546) back to block 530 in FIG. 5b to force a failover to the secondary server 102b. In this way, the client backup program 114 continues returning to the secondary server 102b to perform the read or write type operation until the secondary server 102b is able to synchronize with the primary server 102a to make the level of the objects at the primary server 102a current. Otherwise, if (at block 544) the failback policy 306 indicates that the client is supposed to reconcile the data, then control proceeds to perform the operations at blocks 530-538 in FIG. 5b with respect to the primary server 102a to perform the backup operation with respect to the primary server 102a.

The described embodiments provide automatic techniques for failover and failback between primary 102a and secondary 102b backup servers in order to eliminate the need to manually reconfigure the client 100 and servers 102a, 102b when a preferred server is down. The significant delays and potential errors of manually reconfiguring client nodes are also prevented. Clients automatically identify their alternate servers and are ready for backup or restore operations to an alternate server as soon as the preferred server goes down.

The described embodiments further reduce the possibility of having the preferred backup server with down level backup data by providing a mechanism for automatically controlling when clients can write data to the alternate secondary server. The client backup program 114 can be configured to automatically temporarily block store operations to the alternate secondary server while the preferred primary server is temporarily unavailable with a failover delay 304.

Further, by providing tokens stored at the client 100 and servers 102a, 102b, the client 100 may automatically identify whether a backup server 102a, 102b has the most current set of backup data. This allows an administrator to preconfigure the clients' storage policies during a failover operation to an alternate secondary server. Further, with described embodiments, an administrator may configure the failback policy 306 to control how data on a primary preferred server that has been temporarily unavailable will be reconciled either from the secondary alternate server or from the client system. This configurable failback policy 306 allows the administrator to choose the most efficient method of reconciling data back to the preferred server depending upon the characteristics of the various components of the system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
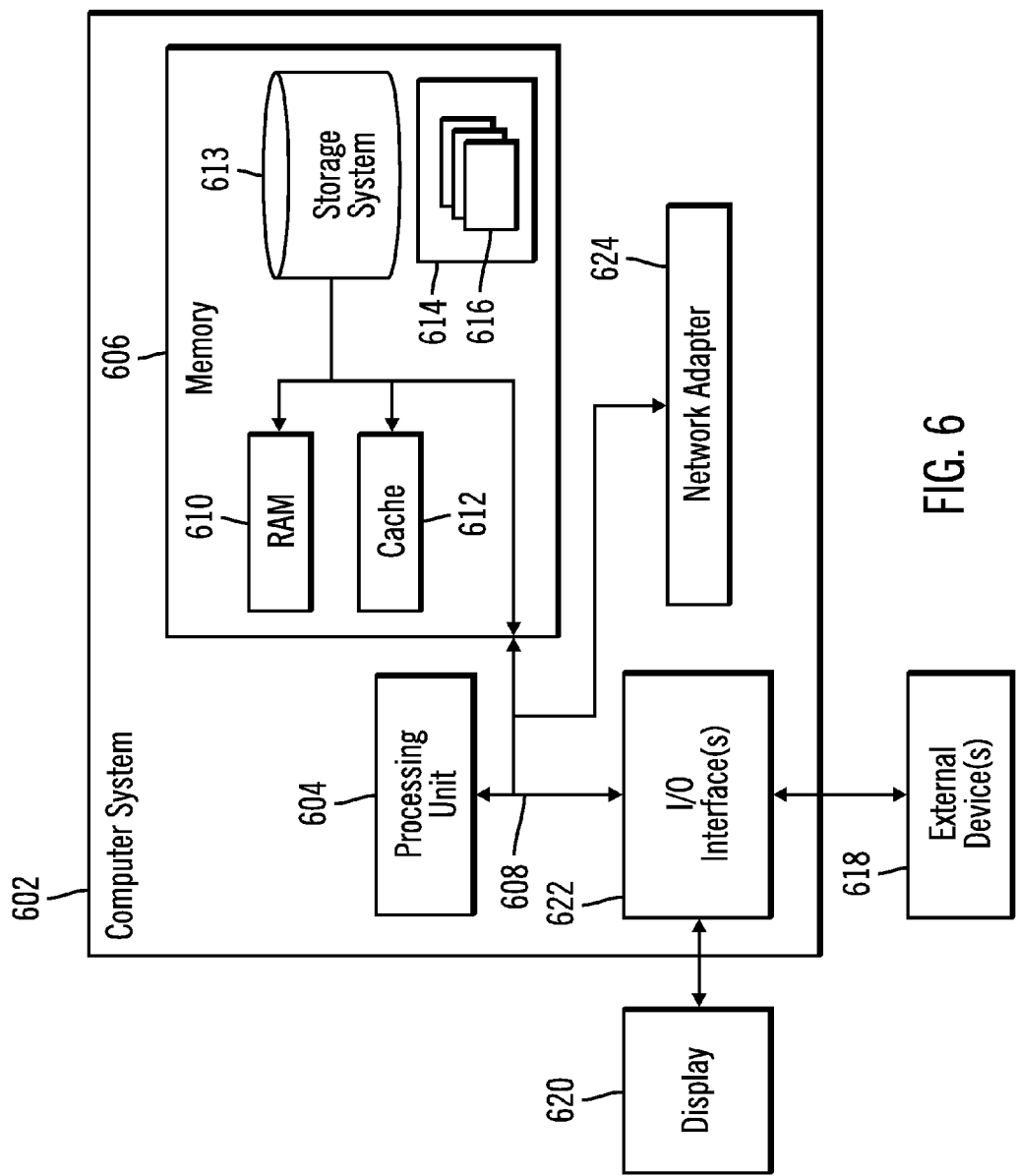
FIG. 6 illustrates a computing environment in which the components of FIG. 1 may be implemented.

The computational components of FIG. 1, including the clients 100 and the servers 102a, 102b may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components may be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for replicating data from a client system between a primary server and a secondary server, comprising:
    determining whether a state of data on the secondary server permits a backup operation in response to determining that the primary server is unavailable and that a force failover parameter is not set;
    attempting to connect to the primary server to perform the backup operation at the primary server in response to determining that the state of the data on the secondary server does not permit the backup operation; and
    performing the backup operation at the secondary server in response to determining that the state of the secondary server permits the backup operation.

2. The method of claim 1, further comprising:
    starting a failover delay timer in response to determining that the force failover parameter is not set and that the primary server is not available; and
    attempting to connect to the primary server to perform the backup operation at the primary server in response to determining that the failover delay timer has not expired and that the state of the secondary server permits the backup operation,
    wherein the backup operation is performed with respect to the secondary server in response to additionally determining that the failover delay timer has expired and that the primary server is not available.

3. The method of claim 1, wherein the performing the backup operation at the secondary server further comprises:
    storing data for the backup operation on the secondary server when the backup operation comprises writing the data, wherein the stored data includes a token indicating a timestamp of the data at the client system that is stored on the secondary server; and
    reporting a state of the stored data on the secondary server including the timestamp included with the stored data on the secondary server to compare with a current timestamp for the data at the client system in response to determining that the backup operation comprises an operation to transfer data to the client system, wherein the reporting enables a user of the client system to determine to proceed with the backup operation.

4. The method of claim 1, wherein the backup operation comprises an incremental backup of data at the client system, wherein the determining whether the state of the secondary server permits the backup operation comprises:
    determining whether the secondary server includes a full backup of the data at the client system, wherein the state does not permit the backup operation when the secondary server does not include the full backup of the data at the client system.

5. The method of claim 1, further comprising:
    in response to determining that the primary server is available, determining whether tokens, on the client system and the primary server, for the data subject to the backup operation indicate the data is at a same level;
    setting the force failover parameter to force a failover to the secondary server in response to determining that the tokens are not at the same level and in response to a failback policy indicating that the secondary server is to reconcile data to the primary server; and
    proceeding to perform the backup operation at the primary server in response to determining that the tokens are not at the same level and in response to the failback policy indicating that the client system is supposed to reconcile data to the primary server.

6. The method of claim 5, wherein the proceeding to perform the backup operation at the primary server comprises:
    storing data for the backup operation on the primary server when the backup operation comprises writing data, wherein the stored data includes a token indicating a timestamp of the data at the client system; and
    reporting a state of the data on the primary server including a timestamp of the data maintained on the primary server to compare with the timestamp for the data at the client system when the backup operation is to transfer data to the client system, wherein the reporting enables a user of the client system to determine to proceed with the backup operation.

7. The method of claim 5, further comprising:
    performing, by the client program, backup operations with respect to the secondary server in response to determining that the tokens are not at the same level and in response to the failback policy indicating that the secondary server is to reconcile data to the primary server until the secondary server replicates current data to the primary server so that the tokens for the data at the primary server are at the same level of the tokens at the client system.

8. The method of claim 1, wherein at least one computer readable storage medium includes a primary server program and a secondary server program, further comprising:
    replicating, by the primary server program, data to the secondary server to maintain a most recent version of the data at the secondary server;
    continuously communicating, by the primary server program, network connection information for the primary and secondary servers to the client system; and
    using, by a client program, the network connection information to connect to the primary and secondary servers.

9. The method of claim 1, wherein there are a plurality of client systems performing backup operations with respect to the primary and secondary servers, wherein the client systems may be configured with different settings for the force failover parameter, wherein clients having the force failover parameter set will always attempt to connect to the secondary server to perform backup operations and wherein clients having the force failover parameter not set will first attempt to connect to the primary server to perform backup operations.

* * * * *